United States Patent [19]

Hurst

[11] 4,206,373

[45] Jun. 3, 1980

[54] LINEAR ELECTRIC MOTOR

[75] Inventor: Ralph Hurst, Clifton Park, N.Y.

[73] Assignee: Exxon Research & Engineering Co., Florham Park, N.J.

[21] Appl. No.: 879,778

[22] Filed: Feb. 21, 1978

[51] Int. Cl.² ............................................. H02K 41/02
[52] U.S. Cl. ....................................... 310/13; 310/64; 310/65
[58] Field of Search ..................... 310/12–13, 310/27, 61, 58, 60, 64, 65, 254, 258, 57

[56] References Cited

U.S. PATENT DOCUMENTS

| 925,271 | 6/1909 | Behrend | 310/65 X |
|---|---|---|---|
| 3,260,875 | 7/1966 | Evans | 310/258 |
| 3,828,211 | 8/1974 | Laronze | 310/13 |

*Primary Examiner*—Donovan F. Duggan
*Attorney, Agent, or Firm*—Paul E. Purwin; Donald F. Wohlers

[57] ABSTRACT

A linear electric motor has an inner armature which is adapted to reciprocate axially and an outer stator which includes a plurality of axially extending laminations which have inner edges engaging each other and defining a cylindrical bore in which the armature is situated. These laminations respectively have axially extending outer edge regions which are oppositely inclined one with respect to the next with each lamination having an outer edge pressing against an outer edge of the next lamination and spaced from the outer edge of the preceding lamination, so that the outer edge regions of the laminations define between themselves axially extending spaces which alternately converge and diverge radially inwardly toward the common axis of the armature and stator.

13 Claims, 4 Drawing Figures

4,206,373

LINEAR ELECTRIC MOTOR

BACKGROUND OF THE INVENTION

The present invention relates to linear electric motors.

Such motors conventionally include an inner armature which is adapted to reciprocate and an outer stator which surrounds the armature. Such a stator conventionally includes a plurality of axially extending laminations which respectively have inner edges engaging each other to define a hollow cylindrical bore in which the armature is situated.

Because such laminations are necessarily situated closer to each other at their inner edges than at their outer edges, inasmuch as the inner diameter of the stator is smaller than the outer diameter thereof, a serious problem is encountered in connection with arranging these axially extending stator laminations in such a way that they are properly situated with respect to each other. Thus, the total thickness of all of the laminations will be approximately equal the circumference of the inner cylindrical bore but is much smaller than the outer circumference of the cylindrical stator.

In an attempt to solve this problem, it has been proposed, for example, to situate axially extending spacers between the laminations at their outer edge regions. However, due to small variations in the thickness of the several laminations or the spacers, experience has shown that it is difficult to insure a tightly packed outside circumferential region for the stator as well as a tightly packed bore circumference inasmuch as one of these circumferences can become solidly packed before the other.

Another attempt to solve this problem is shown in U.S. Pat. No. 3,828,211. Thus, according to this patent, the laminations are deformed at the regions of their outer edges so as to occupy at their outer edges a greater space than at their inner edges. The deforming of the laminations according to this patent includes preferably providing each lamination with a channel-shaped portion at its outer edge or forming each lamination inwardly of but adjacent to its outer edge with a hollow rib, so that the engagement between these hollow ribs or the engagement between the above channels will enable the laminations to occupy at the regions of their outer edges more space than at their inner edges. However, none of these expedients are able to compensate properly for variations in the thickness of the laminations because of their inherent stiffness and rigidity with the result that the stator laminations of such a construction become tightly packed at one circumference of the stator before the other circumference thereof. Furthermore, the lamination configuration suggested by the aforesaid patent necessitates the use of complex forming dies and undue working of the electrical grade iron used in the stator laminations.

SUMMARY OF THE INVENTION

It is accordingly a primary object of the present invention to provide a construction which will avoid the above drawbacks.

Thus, it is an object of the present invention to provide a linear motor with a stator which includes resilient laminations which can cooperate with each other in such a way that they can automatically compensate for variations in the thickness of the laminations.

In addition, it is an object of the present invention to provide a linear motor of the above type which takes advantage of the spaces between the stator laminations to provide for flow of fluid therethrough for purposes such as cooling the stator or for providing a linear motor which can serve to drive a compressor in which the compressor fluid will flow through the spaces between the laminations during operation of the compressor.

According to the invention, the stator laminations have inner axially extending edges which engage each other to define a cylindrical space in which the armature of the motor is situated to reciprocate therein. The stator laminations of the invention have outer edge regions which are radially outward from their inner edges. The outer edge regions of the circumferentially successive laminations are inclined oppositely one with respect to the next. Spaced pairs of these laminations engage and press against each other at their outer edges so that the axially extending outer edge of one lamination presses against the axially extending outer edge of the next lamination while being spaced from the axially extending outer edge of the preceding lamination, thus providing the stator at its outer circumferential region with a series of axially extending spaces which alternately converge and diverge in a direction radially inwardly toward the axis of the stator.

BRIEF DESCRIPTION OF THE DRAWINGS

The invention is illustrated by way of example in the accompanying drawings which form part of this application and in which.

DESCRIPTION OF PREFERRED EMBODIMENTS

Figure 1:
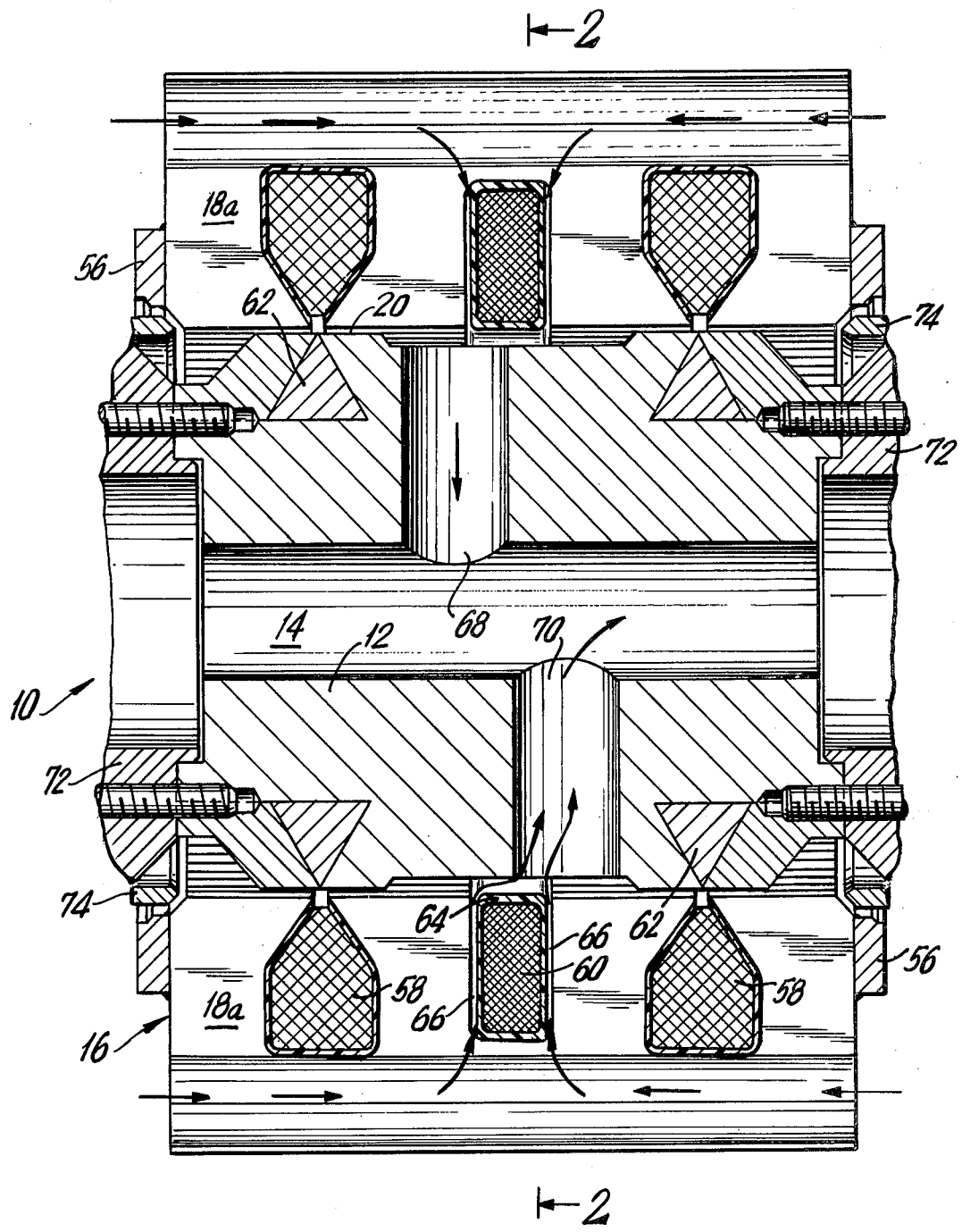
FIG. 1 is a fragmentary sectional elevation of one possible embodiment of a linear motor according to the invention, the section of FIG. 1 being taken in a plane which contains the common axis of the armature and the stator.
Figure 2:
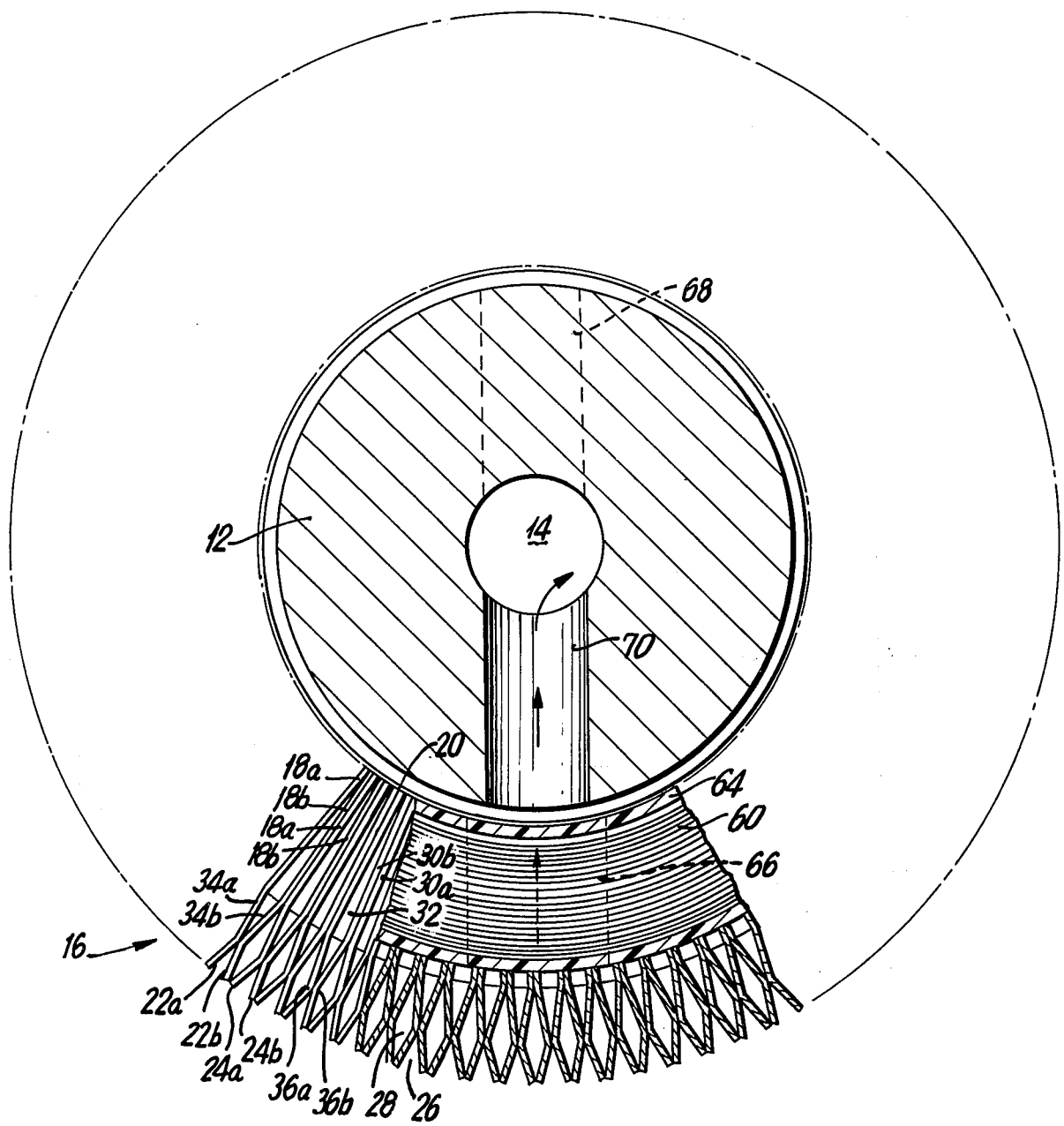
FIG. 2 is a transverse section of the structure of FIG. 1 taken along line 2—2 of FIG. 1 in the direction of the arrows.

Referring to FIGS. 1 and 2, there is shown therein a linear electric motor 10 which includes an armature 12 in the form of a cylindrical body which is formed with an axial bore 14 the axis of which coincides with the axis of the armature 12. The armature 12 is surrounded by and spaced from a stator 16. This stator 16 is composed of a plurality of identically shaped laminations 18a and 18b which alternate with each other circumferentially around the stator 16.

As is apparent particularly from FIG. 2, the series of alternating laminations 18a, 18b all have inner axially extending edges which engage each other to define the hollow cylindrical bore or space 20 in which the armature 12 is free to reciprocate.

As is also apparent particularly from FIG. 2, the outer axially extending edge regions 22a of the laminations 18a are inclined in one direction while the outer axially extending edge regions 22b of the laminations 18b are inclined in the opposite direction. Thus, it will be seen that with the illustrated assembly arrangement each lamination has an outer edge pressing against an outer edge of the next lamination and spaced from the outer edge of the preceding lamination. Thus, the outer edge 24a of each lamination 18a presses against the outer edge 24b of the next lamination 18b while being spaced from the outer edge 24b of the preceding lamination. In this way, the successive laminations define between themselves at the outer region of the stator a series of axially extending spaces 26 and 28 which alternate with each other circumferentially around the stator and which successively converge and diverge in a direction which is radially inward toward the stator axis.

Moreover, it will be seen from FIG. 2 that the laminations 18a, 18b are arranged in pairs each having flat regions 30a, 30b engaging each other over their entire areas. Thus, between these engaging pairs of flat regions 30a, 30b, the laminations define between themselves axially extending spaces 32 which converge inwardly toward the location where the inner edges of the laminations engage each other at the inner bore 20.

In the example of FIG. 2, each lamination has between its flat region and its outer inclined edge region an intermediate longitudinal region which is inclined oppositely from its outer inclined edge region. Thus, the laminations 18a have intermediate longitudinally extending regions 34a inclined oppositely to their outer edge regions 22a, while the laminations 18b have intermediate axially extending regions 34b which are inclined oppositely to the outer edge regions 22b thereof. Thus, it will be seen that the pairs of laminations which engage each other at their flat regions have the intersections 36a, 36b between their outer and intermediate axially extending regions pressing against each other.

The laminations 18a, 18b are made of a springy sheet material, so that they can yieldably and resiliently press against each other at their outer edges 24a, 24b, thus providing the assembly of laminations with the capability of automatically compensating for any variations in the thickness of the several laminations.

Figure 3:
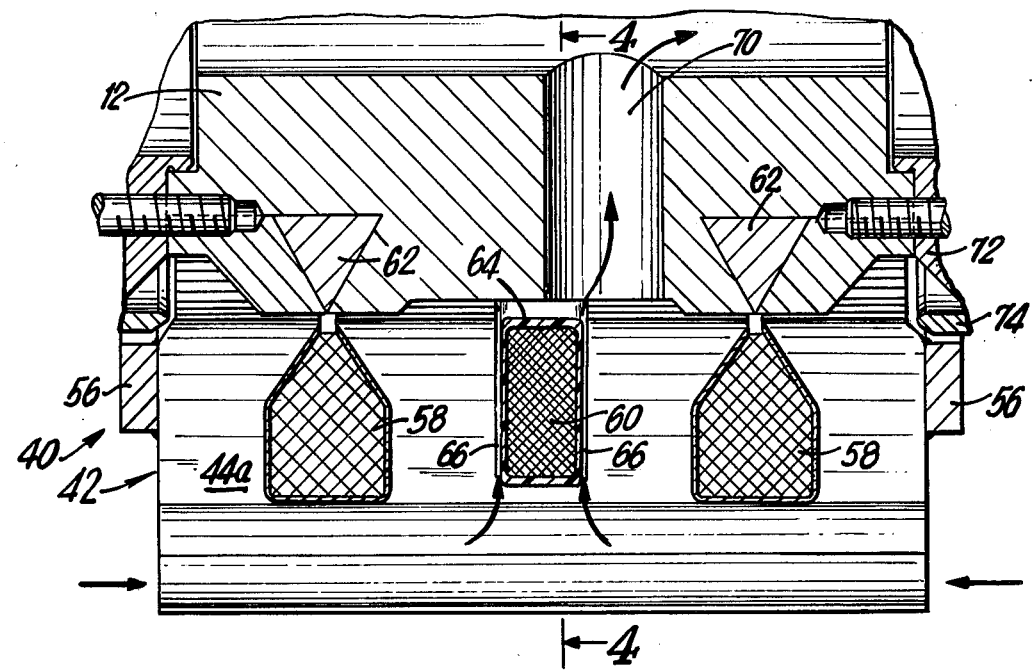
FIG. 3 is a fragmentary axial section of another and preferred embodiment of a linear motor according to the invention.
Figure 4:
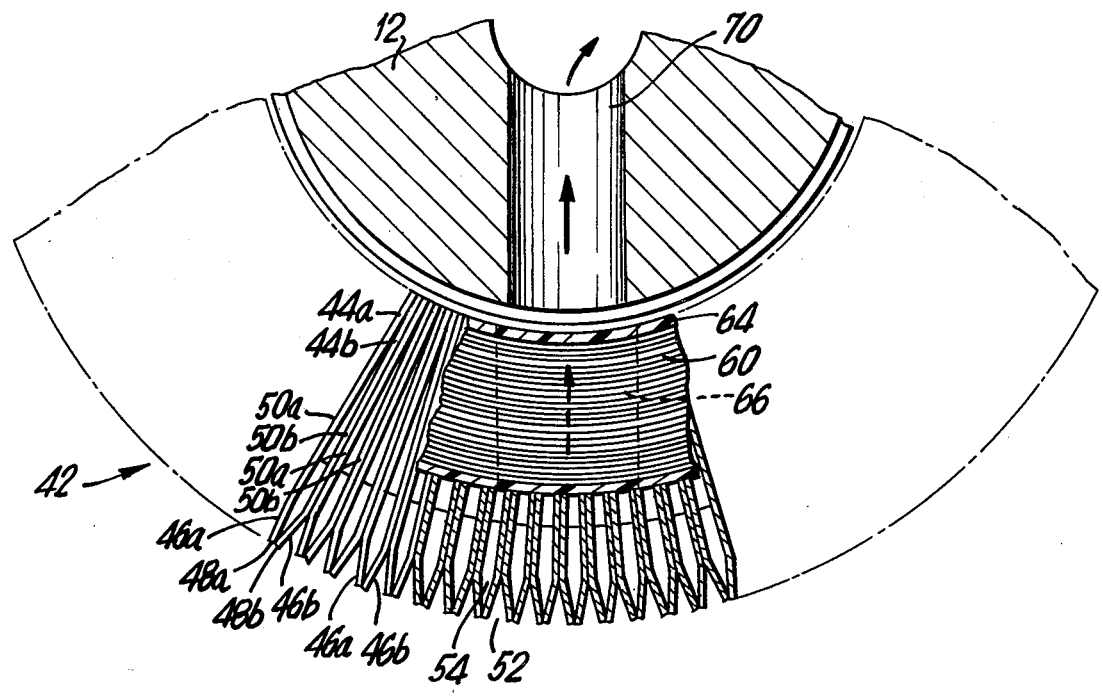
FIG. 4 is a fragmentary transverse section of the structure of FIG. 3 taken along line 4—4 of FIG. 3 in the direction of the arrows.

The embodiment of the invention which is illustrated in FIGS. 3 and 4 is identical with that of FIGS. 1 and 2 except for the construction of the laminations. Thus, FIGS. 3 and 4 show a linear electric motor 40 which has an armature 12 identical with that of FIGS. 1 and 2. This motor 40 includes a stator 42 which has a series of laminations 44a, 44b which alternate with each other circumferentially around the common axis of the stator and armature. These laminations 44a, 44b also have outer axially extending edge regions 46a, 46b which are oppositely inclined one with respect to the next and which engage each other at their outer edges 48a, 48b. However, it will be seen that with this embodiment the flat regions 50a, 50b engage each other in pairs as illustrated and extend all the way out to the inclined edge regions 48a, 48b. This embodiment is somewhat simpler than the embodiment of FIGS. 1 and 2 and preferred in that the laminations are formed with but a single bend being entirely flat except for their oppositely inclined outer edge regions. Thus, in the embodiment of FIGS. 3 and 4, the successive oppositely inclined outer edge regions of the successive laminations which are distributed circumferentially around the stator engage each other in such a way that the inclined outer edge region of one lamination engages the next lamination but is spaced from the preceding lamination, thus defining in this embodiment also at the outer region of the stator axially extending spaces 52, 54 which respectively converge and diverge inwardly toward the central axis of the stator. However, it will be seen that in FIG. 4 the inwardly diverging spaces 54 communicate also with the spaces between the pairs of laminations which engage each other at their flat regions. In the case of FIG. 2, the inwardly diverging spaces 28 are closed by the engaging pairs of flat regions. The embodiment of FIGS. 3 and 4 also will provide the advantage of enabling the several laminations to resiliently and yieldably press against each other at their outer edges 48a, 48b so as to compensate automatically for any variations in the thickness of the laminations with the advantage that they require only one bend or axial deformation to be made thereto thus simplifying the manufacture, i.e. stamping process.

It is furthermore to be noted that in both embodiments of the invention the extent to which the laminations are inclined is shown in an exaggerated manner for the sake of clarity. Obviously, the angle of bend necessary to be imparted to each lamination will be determined by many variables in the stator design, such as the difference between inner and outer diameter, thickness of the laminations, and radial position of point of bend.

As is apparent particularly from FIG. 1, after the several stator laminations are assembled in a suitable holding jig (not shown), they are welded at their end edges to steel rings 56.

Furthermore, in both embodiments the laminations are formed with notches which are circumferentially aligned for forming circumferential stator openings in which a plurality of stator coils are situated. Thus, it will be seen that in both embodiments the stator includes a pair of outer coils 58 and an intermediate coil 60. These coils 58, 60 are suitably potted so as to be encased within a layer of electrical insulating material. The coils 58, in a well known manner, are A.C. coils while the coil 60 is a D.C. coil. The armature 12 is provided with a pair of short-circuiting coils or rings 62. Such short-circuiting rings may be made of copper, for example. Reference may be made to U.S. Pat. No. 3,891,874 for a complete description of the electrical operation of the type of linear motor shown.

Portions of the outer plastic covering 64 of the intermediate D.C. coil 60 are recessed or notched at a plurality of circumferential points at opposite sides so as to define with the adjacent laminations a plurality of circumferential spaces or passageways 66 which freely communicate with the spaces 32 in FIG. 2 and 54 in FIG. 4. Furthermore, as is apparent from FIGS. 1 and 3, the outer ends of the stator are open outwardly beyond the rings 56. Thus, it is possible in this way to provide a fluid path for a fluid such as air or refrigerant which can flow as indicated, for example, by the arrows, in the spaces 32, 54 between the adjoining pairs of laminations and through the circumferential stator spaces 66 to reach the inner cylindrical space 20 in which the armature is situated. The armature 12 itself is formed with a pair of diametrically opposed radial bores 68, 70 which communicate with the bore 14 as well as with the space 20 so that the fluid path can extend through the bores 68, 70 into the bore 14.

In the illustrated example, the linear motor may be operatively connected with a compressor such as a resonant free piston compressor of the type shown in U.S. Pat. No. 3,937,600 so as to operate the same. For this purpose, the opposite ends of the armature 12 may be fixed to a pair of pistons 72 (shown fragmentally)

capable of reciprocating within stationary hollow cylinder portions 74, respectively, as is more completely shown in U.S. Pat. No. 3,937,600. The pistons 72 and cylinder 74 will be understood to carry suitable one-way valves to either create a suction or pressure increase on the bore 14 and passageways 68 and 70, permitting air to flow therethrough in one direction.

Thus, in the illustrated example, as can be seen from the arrows, the one-way valves (not shown) carried by the pistons are arranged to permit the fluid to flow only from the hollow interiors of the pistons outwardly therefrom to reach the interiors of the cylinders. During the suction stroke of each piston 72, air will be drawn into the same as indicated by the arrows, and during the pressure stroke of each piston, the air will be compressed and will be forced to travel out through the one-way valve carried by each cylinder. In this way the cooling fluid such as air can flow as illustrated from each end of the stator through the spaces 32 or 54 into passageways 66 between the laminations and into the hollow interior of the armature to then be compressed. In this way, the fluid flow will provide suitable cooling for the motor. It is to be noted, however, that this direction would be reversed from the direction of the arrows as shown if the passageways 14, 68, 70, 66, etc., were on the discharge side of the compressor rather than the suction side as shown. In either case, it will be noted that the fluid always flows in opposite directions between the ends of the stator laminations and the central regions thereof, to provide an exceedingly effective symmetrical cooling flow.

What is claimed is:

1. In a linear electric motor, an inner armature which is adapted to reciprocate axially, and a generally cylindrical outer stator surrounding said armature and having an axis in common therewith, said stator including a plurality of axially extending laminations which respectively have inner longitudinal axially extending edges situated in side-by-side relation and circumferentially distributed about said armature while butting against each other to define a hollow cylindrical space in which said armature is situated, said laminations respectively having axially extending outer edge regions distant from their inner edges and successively inclined respectively in opposite directions with each lamination having an outer axially extending edge pressing against the axially extending outer edge of the next lamination while being spaced from the outer axially extending edge of the preceding lamination, so that each pair of laminations press against each other at their outer circumferential edges to define an axially extending line engagement of each said pair of laminations and defining between said outer edge regions thereof an axially extending space which diverges in a radial direction inwardly toward said axis, while each pair of successive laminations which have their outer edges spaced from each other define between themselves an axially extending space which diverges in a radial direction outwardly from said axis and which is open at the exterior of said stator, and said laminations being made of a springy sheet material so that said outer edges of said laminations resiliently press against each other.

2. In a linear electric motor, an inner armature which is adapted to reciprocate axially, and a generally cylindrical outer stator surrounding said armature and having an axis in common therewith, said stator including a plurality of axially extending laminations made of a springy sheet material, said laminations having inner longitudinal axially extending edges situated in side-by-side relation and circumferentially distributed about said armature while butting against each other to define a hollow cylindrical space in which said armature is situated, said laminations respectively having axially extending outer edge regions distant from their inner edges and successively inclined respectively in opposite directions with each lamination having an outer axially extending edge resiliently pressing against the axially extending outer edge of the next lamination while being spaced from the outer axially extending edge of the preceding lamination, so that each pair of laminations press against each other at their outer circumferential edges to define an axially extending line engagement of each said pair of laminations and defining between said outer edge regions thereof an axially extending space which diverges in a radial direction inwardly toward said axis, while each pair of successive laminations which have their outer edges spaced from each other define between themselves an axially extending space which diverges in a radial direction outwardly from said axis and which is open at the exterior of said stator, and each said lamination further having an essentially flat longitudinally extending region which extends substantially radially outward from said inner edges and said laminations being arranged in pairs having their flat regions engaging each other with each pair of flat engaging regions defining with adjoining pairs of flat engaging regions longitudinally extending spaces which converge in a radially inward direction and are closed at the inner edges of said laminations and each said lamination additionally having at least one notched region extending radially outward from said inner edge to form an inner circumferential channel which is both in fluid communication with said inner cylindrical space and in fluid communication with said longitudinally extending spaces to permit fluid flow therebetween.

3. The combination of claim 2 wherein said stator includes at least one coil situated in said circumferential channel and at least one of said coils having one or more passageways to provide fluid communication between said inner cylindrical space and said longitudinally extending spaces.

4. The combination of claim 2 wherein said flat regions of said laminations extend outwardly all the way up to said oppositely inclined outer edge regions of said laminations.

5. The combination of claim 2 and wherein said flat regions of said laminations extend outwardly from said inner edges thereof toward but terminate short of said oppositely inclined outer edge regions of said laminations, and each lamination having between its flat region and its outer edge region a longitudinally extending substantially flat and planar intermediate region which is inclined oppositely to its outer edge region, so that each pair of laminations which engage each other at their flat regions diverge from each other in a radially outward direction beyond their engaging flat regions, at said longitudinal intermediate regions of the latter pair of laminations, and then converge toward each other in a radially outward direction at said outer edge regions thereof while engaging each other at their outer edges, and the outer and intermediate edge regions of each lamination defining between themselves an intersection which engages the corresponding intersection between the outer and intermediate edge regions of the next lamination.

6. The combination of claim 2 or 3 wherein said armature has a hollow interior and is formed with at least one bore extending radially from said hollow interior to said cylindrical space so that the path of fluid flow also includes said bore of said armature and said hollow interior thereof.

7. The combination of claim 6 wherein each lamination has three of said notches, the latter defining three circumferential openings, and said stator having three coils respectively situated in said openings, said coils forming an intermediate D.C. coil and a pair of outer A.C. coils, and said passageway being adjacent said intermediate D.C. coil.

8. The combination of claim 7 wherein said stator is formed with at least a pair of said passageways at opposite sides of said intermediate coil, and said path of fluid flow extending in opposite axial directions in said spaces between said flat engaging regions of said laminations.

9. The combination of claim 8 wherein said armature is formed with a pair of said bores respectively extending substantially in opposite directions with respect to the common axis of said armature and stator while being axially offset with respect to each other.

10. An annular stator for a linear electric motor wherein the motor armature is mounted for reciprocating movement within a central opening of said stator, said stator comprising a plurality of laminations having an inner edge portion in contiguous contact with one another to define said central opening of said stator and outer portions including at least one axially extending angular bend therein to define with an adjacent lamination having a similar bend a plurality of axial passageways extending from one end of said stator to the opposite end thereof, each of said laminations including a central notched portion dividing said inner edge portion into two equal length end portions and defining an inner circumferential channel for receiving a motor winding, said channel having an outside diameter extending into said passageways between said laminations to place said channel in fluid communication with said passageways, whereby symmetrical and efficient heat transfer from said stator is provided by the flow of fluid between said central circumferential channel, through said passageways and the opposite ends of said stator.

11. The combination of claim 10 wherein said circumferential channel includes a motor winding having a surrounding dielectric outer casing, said casing including a plurality of radially extending relieved portions forming a plurality of radial channels in cooperation with said circumferential channel in communication with said passageways.

12. The combination of claim 10 wherein said angular bend is less than about 45°.

13. The combination of claim 10 wherein said angular bend is less than about 20°.

* * * * *